United States Patent
Shimizu et al.

[11] Patent Number: 5,925,082
[45] Date of Patent: Jul. 20, 1999

[54] VEHICLE STEERING CONTROL SYSTEM WITH DRIVER ALERTNESS DETERMINATION

[75] Inventors: Yasuo Shimizu; Hiroyuki Tokunaga; Hiroshi Sekine, all of Saitama-ken, Japan

[73] Assignee: Honda Giken Kogyo Kabushiki Kaisha, Tokyo, Japan

[21] Appl. No.: 08/800,093

[22] Filed: Feb. 12, 1997

[30] Foreign Application Priority Data

Feb. 12, 1996 [JP] Japan .................................. 8-049516

[51] Int. Cl.$^6$ .............................. B60K 28/02; B62D 6/00
[52] U.S. Cl. .............................. 701/41; 180/272; 180/443
[58] Field of Search .................................. 701/23, 41, 42, 701/45, 213; 180/272, 443; 340/439, 576

[56] References Cited

U.S. PATENT DOCUMENTS

| | | | |
|---|---|---|---|
| 4,463,347 | 7/1984 | Seko et al. | 340/576 |
| 4,586,032 | 4/1986 | Seko et al. | 340/576 |
| 4,594,583 | 6/1986 | Seko et al. | 340/576 |
| 5,146,219 | 9/1992 | Zechnall | 340/576 |
| 5,325,295 | 6/1994 | Fujii | 340/936 |
| 5,488,353 | 1/1996 | Kuwakami et al. | 340/576 |
| 5,588,733 | 12/1996 | Gotou | 362/37 |
| 5,661,650 | 8/1997 | Sekine et al. | 364/424.027 |
| 5,717,606 | 2/1998 | Hara et al. | 364/551.01 |

FOREIGN PATENT DOCUMENTS 6-255514  9/1994  Japan .

Primary Examiner—Michael J. Zanelli
Attorney, Agent, or Firm—Skjerven, Morrill, MacPherson, Franklin & Friel LLP; Alan H. MacPherson; Hugh H. Matsubayashi

[57] ABSTRACT

The alertness of the vehicle operator is determined from an operating condition of the vehicle such as the steering torque, the rack thrust, and/or the yaw rate, and the determined level of alertness of the vehicle operator is advantageously reflected in the control property of the steering control system. If the alertness of the vehicle operator is significantly low, and the vehicle operator may even have dozed off, the steering control system then maximizes its intervention in the steering control so that the vehicle is automatically forced to travel along the proper path of travel. If desired, the vehicle operator may be warned by applying a vibratory torque to the steering wheel. Conversely, when the alertness of the vehicle operator is high, the intervention of the control system in the steering control is minimized so that the intentional steering effort by the vehicle operator would not be resisted or opposed by the steering control system even when an extreme steering operation is carried out.

8 Claims, 9 Drawing Sheets

VEHICLE STEERING CONTROL SYSTEM WITH DRIVER ALERTNESS DETERMINATION

TECHNICAL FIELD

The present invention relates to a vehicle steering system which can assist the vehicle operator's effort to follow the driving lane or the shape of the road, and in particular to a vehicle steering system which can effectively prevent the vehicle from veering off away from the driving lane or the road due to the insufficient alertness of the vehicle operator while permitting any intentional swerving movement of the vehicle.

BACKGROUND OF THE INVENTION

There have been a number of proposals to prevent a vehicle from veering off a prescribed driving lane or road owing to the loss of the alertness of the vehicle operator. For instance, Japanese patent laid-open publication (kokai) No. 6-255514 discloses a steering control system which detects the current position of the vehicle relative to a lane dividing line by capturing its image with an image processing device, and controls a power steering system so as to maintain the vehicle centrally in the driving lane.

However, this previously proposed steering control system can detect any intention of the vehicle operator to change the driving lane or to make a right or left turn only by the actuation of a turn signal. Therefore, the system may be able to detect any deviation of the vehicle from a straight path which may be caused unintentionally by the vehicle operator, but is unable to properly respond to any intentional effort made by the vehicle operator to swerve the vehicle away from a straight path. For instance, when the vehicle operator attempts to avoid any object on the road by swerving the vehicle away from its straight course, the steering control system, unable to detect the intention of the vehicle operator, may resist such an effort made by the vehicle operator.

Thus, it has been desired to provide a vehicle steering control system which can distinguish between an unintentional veering of the vehicle away from a proper course of travel and an intentional deviation of the vehicle from an originally intended path of travel.

BRIEF SUMMARY OF THE INVENTION

In view of such problems of the prior art, a primary object of the present invention is to provide a vehicle steering control system which can automatically maintain a vehicle on a prescribed path of travel, but allows the vehicle operator to turn the vehicle away from the prescribed path of travel if necessary without resisting such an effort by the vehicle operator.

A second object of the present invention is to provide a vehicle steering control system which can maintain a vehicle on an intended path of travel at all times by distinguishing between the presence and absence of any intentional manual steering action.

A third object of the present invention is to provide a vehicle steering control system which can detect the alertness of the vehicle operator, and can reflect the detected alertness of the vehicle operator in the steering control parameters.

According to the present invention, these and other objects can be accomplished by providing a vehicle steering control system, comprising: manual steering input means for manually actuating a steering system of a vehicle; an actuator for providing a supplemental steering torque to the steering system; actual direction detecting means for detecting an actual traveling direction of the vehicle; target direction determining means for defining a target traveling direction of the vehicle; deviation computing means for determining a deviation of the actual traveling direction from the target traveling direction; control means for controlling the actuator so as to reduce the deviation determined by the deviation computing means; and alertness determining means for determining an alertness of an operator of the vehicle from an operating condition of the vehicle; the control means increasing a command torque for the actuator for a given value of the deviation with a decline in the alertness of the vehicle operator.

Therefore, according to the present invention, the steering control becomes more fully automatized as the alertness of the vehicle operator drops. For instance, if the alertness of the vehicle operator is significantly low, and the vehicle operator may even have dozed off, because the steering control system then maximizes its intervention in the steering control, the vehicle is automatically forced to travel along the proper path of travel. In such a case, it may be appropriate to suitably warn the vehicle operator, for instance by applying a vibratory torque to the steering wheel.

Conversely, when the alertness of the vehicle operator is high, the intervention of the control system in the steering control is minimized, and the intentional steering effort by the vehicle operator would not be resisted or opposed by the steering control system even when an extreme steering operation is carried out.

The actual direction detecting means may comprise a geomagnetic sensor, and the target direction determining means may comprise global positioning system which can determine a shape of a road ahead of the vehicle. Typically, the control means comprises a feedback controller which commands a supplemental command torque to the actuator so as to minimize the deviation determined by the deviation computing means, for instance, by increasing the control gain of the feedback controller in proportion to a decline in the alertness of the vehicle operator.

The alertness of the vehicle operator may be determined by collecting data on manual steering torque applied to the manual steering input means. Normally, as the alertness of the vehicle operator drops, the occurrence of abrupt corrective steering operations increases. Therefore, by detecting each occurrence of a manual steering torque exceeding a threshold level, and counting the occurrences of a manual steering torque exceeding the threshold level, it is possible to evaluate the alertness of the vehicle operator with a reasonable accuracy.

Owing to the recent progress in the technology of global positioning systems, it is possible to determine the shape of the road ahead of the vehicle. Therefore, the alertness determining means may also comprise means for detecting an actual yaw rate of the vehicle, means for predicting a reference yaw rate which is predicted from the shape of the road ahead of the vehicle determined by the global positioning system, and means for collecting data on a deviation of the actual yaw rate from the reference yaw rate.

By integrating the yaw rate of the vehicle, it is possible to determine the absolute direction of the vehicle at each time point. Therefore, instead of measuring the direction of the vehicle, the yaw rate of the vehicle may be compared with a reference yaw rate which is predicted from a map information on the road ahead so that the vehicle may follow the road. According to one aspect of the present invention, the vehicle steering control system of the present invention may comprise: manual steering input means for manually actuating a steering system of a vehicle; an actuator for providing a supplemental steering torque to the steering system; navigational guide means for predicting a traveling path of the vehicle; actual yaw detecting means for detecting an actual yaw rate of the vehicle; target yaw determining means for determining a target yaw rate of the vehicle according to the traveling path predicted by the navigational guide means; deviation computing means for determining a deviation of the actual yaw rate from the target yaw rate; control means for controlling the actuator so as to reduce the deviation determined by the deviation computing means; and alertness determining means for determining an alertness of an operator of the vehicle from an operating condition of the vehicle; the control means increasing a command torque for the actuator for a given value of the deviation with a decline in the alertness of the vehicle operator.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
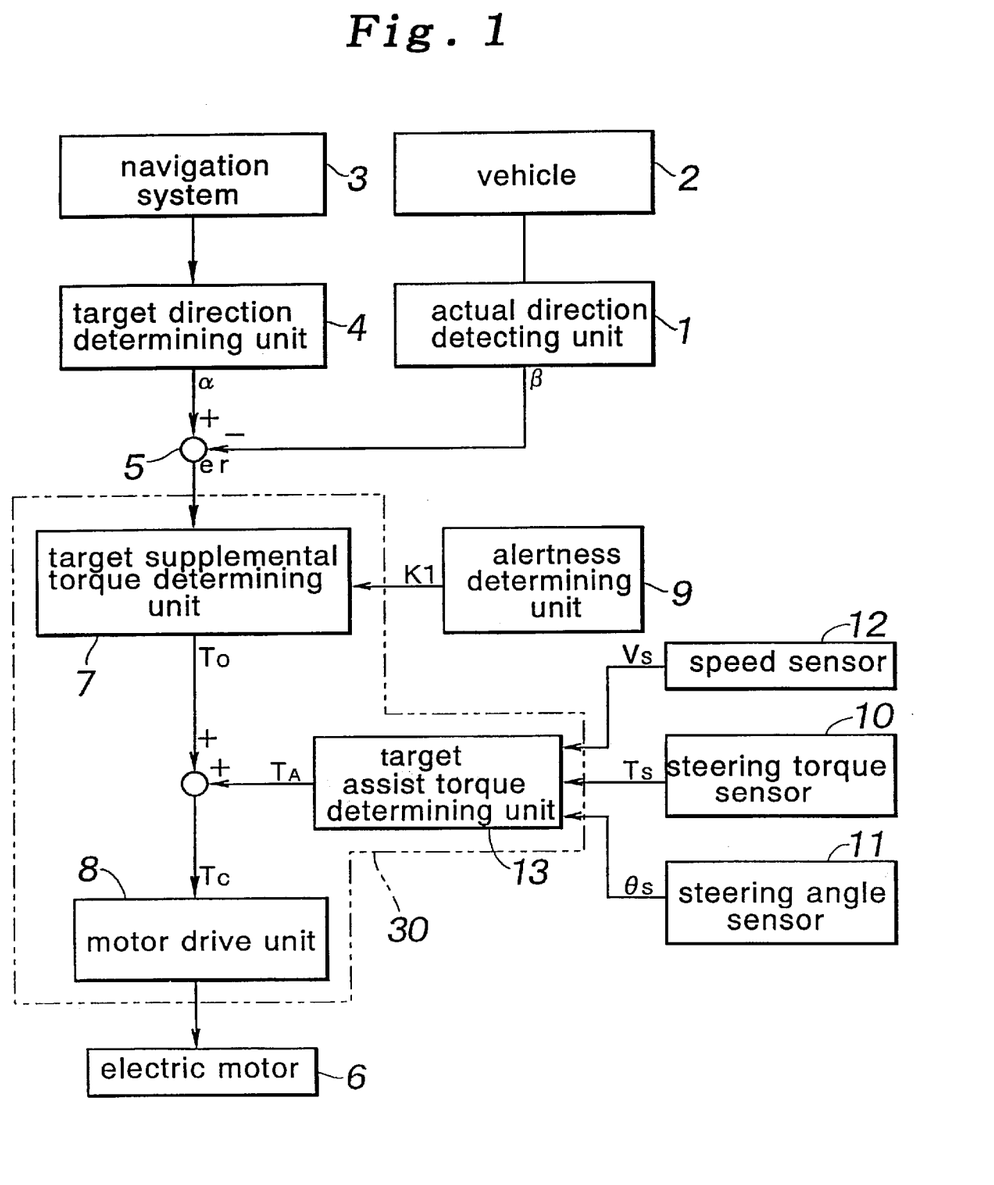
FIG. 1 is an overall block diagram of an electric power steering system constructed according to the present invention.

FIG. 1 shows the overall structure of an electric power steering system according to the present invention. This steering system comprises an actual direction detecting unit 1 consisting of a geomagnetic sensor for detecting an actual direction β of a vehicle 2, a target direction determining unit 4 which determines the tangential direction α of the road immediately ahead of the vehicle according to information obtained from a car navigation system 3 (which is described hereinafter), a deviation computing unit 5 for detecting a deviation er of the actual vehicle direction β from the target direction α, a target supplemental torque determining unit 7 for computing a supplemental torque $T_O$ which electric motor 6 should produce for reducing the deviation er, and a motor drive unit 8 for supplying a command signal to the electric motor 6 according to the supplemental torque $T_O$ obtained by the target supplemental torque determining unit 7.

This electric power steering system is capable of producing the torque required to steer the vehicle all by itself, but normally supplies a variable target supplemental torque $T_O$, by using the electric motor 6, from to the target supplemental torque determining unit 7 in dependence on the level of a signal K supplied from an alertness determining unit 9 (which is described hereinafter). This signal corresponds to the level of the alertness of the vehicle operator as described hereinafter. A manual steering torque Ts applied to a steering wheel is detected by a steering torque sensor 10. Only when the manual steering torque Ts exceeds a prescribed threshold value, the power steering system performs its function as a normal power steering system by computing a target assist torque $T_A$ in a target assist torque determining unit 13 from an output signal θs of a steering angle sensor 11 and a signal Vs from a vehicle speed sensor 12, as well as the manual steering torque Ts, and adding the target assist torque $T_A$ to the variable target supplemental torque $T_O$.

Figure 2:
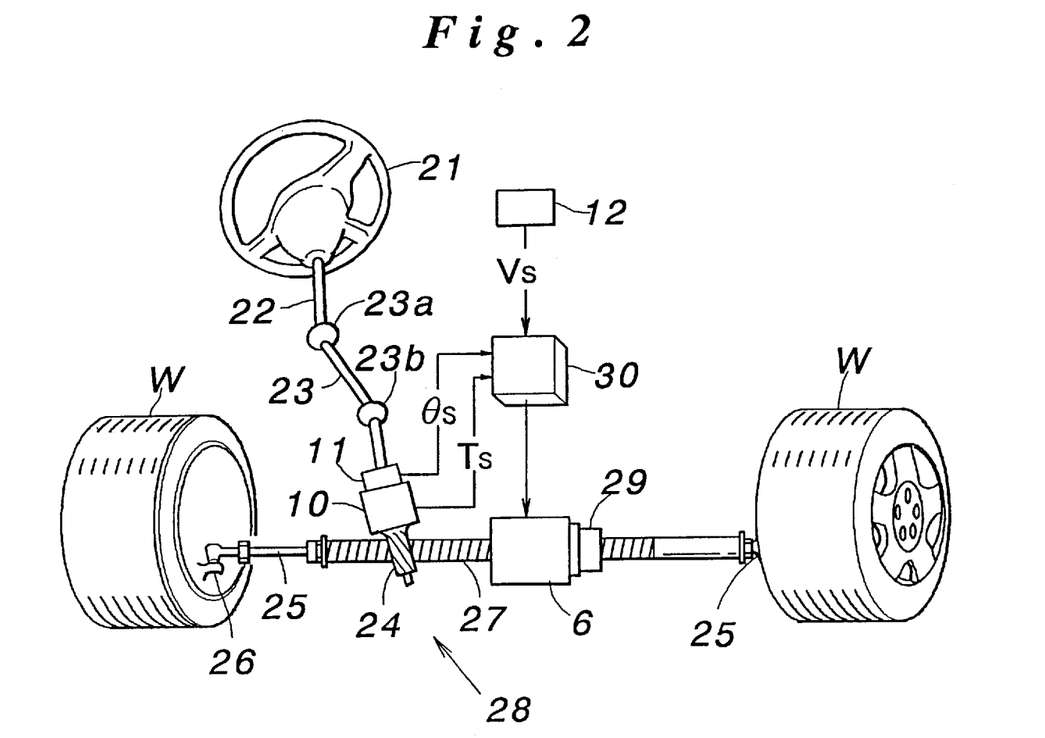
FIG. 2 is a diagrammatic view of the mechanical arrangement of the electric power steering system.

FIG. 2 shows the mechanical structure of the electric power steering system shown in FIG. 1. This electric power steering system comprises a steering wheel 21, a steering shaft 22 integrally attached to the steering wheel 21, a pinion 24 connected to the steering shaft 22 via a connecting shaft 23 provided with a pair of universal joints 23a and 23b, and a rack and pinion steering gear system 28 including a rack 27 which meshes with the pinion 24 and actuates knuckle arms 26 of right and left front wheels W via tie rods 25 by moving laterally with respect to the vehicle body. The electric power steering system is incorporated with the electric motor 6 which is coaxially disposed with respect to the rack 27, and a ball and nut mechanism 29 which converts the rotational torque of the electric motor 6 into the axial thrust of the rack 27.

The steering system further comprises a control unit 30 which controls the output of the electric motor 6 according to the signal Ts from the steering torque sensor 10 associated with the pinion 24, the signal θs obtained from the steering angle sensor 11 attached to the pinion 24 to detect the steering angle of the steering wheel 21, and the signal Vs from the vehicle speed sensor 12.

Figure 3:
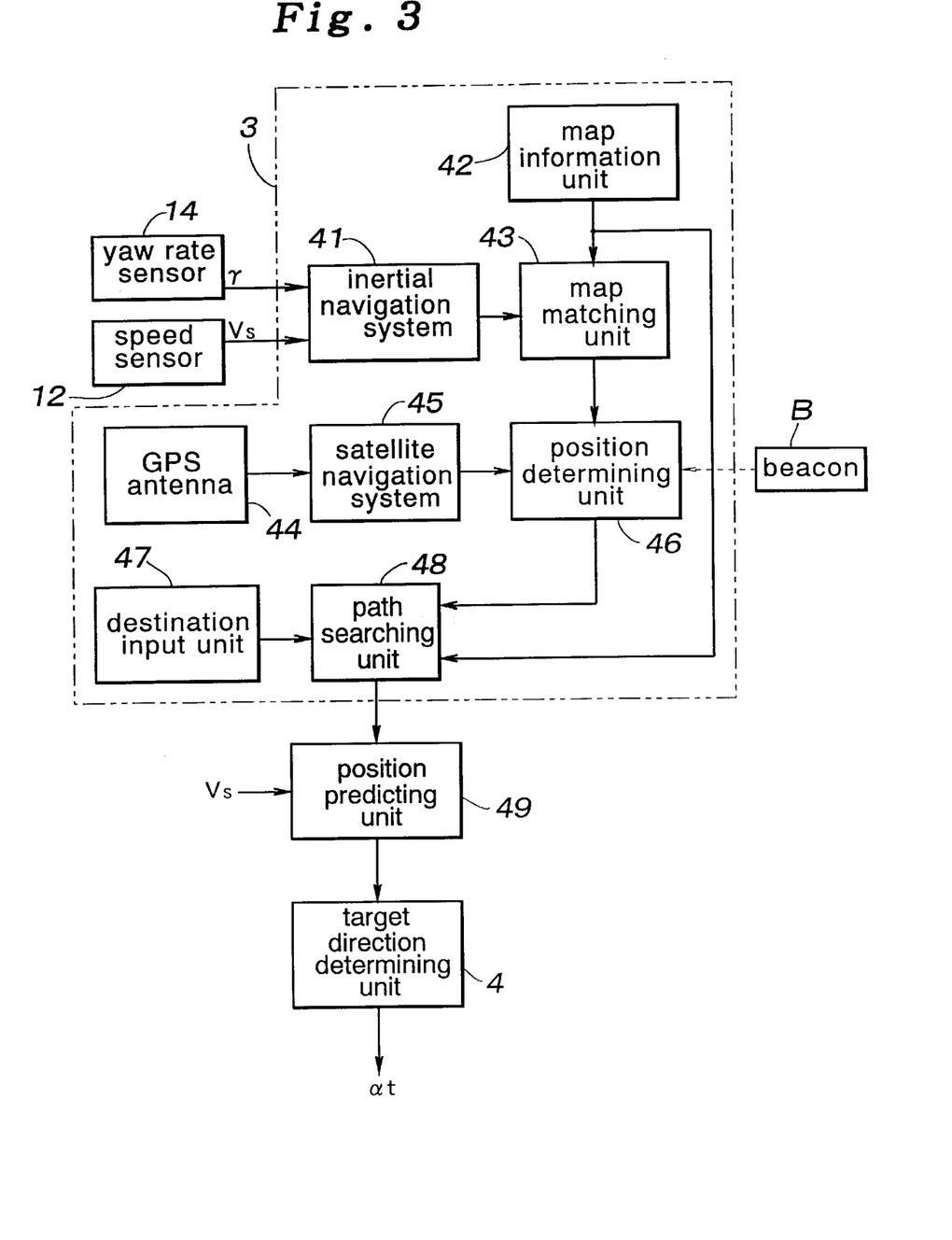
FIG. 3 is a block diagram of the car navigation system.

FIG. 3 shows the structure of the car navigation system 3 for determining the target direction of the vehicle. The car navigation system 3 comprises an inertial navigation system 41 which determines the trajectory of the vehicle according to signals γ and Vs from a yaw rate sensor 14 and the vehicle speed sensor 12, a map information output unit 42 which may include a CD-ROM containing map information, a map matching unit 43 which compares the actual trajectory of the vehicle with the map information, a satellite navigation system 45 which determines the global position of the vehicle according to a signal from a GPS antenna 44, a position determining unit 46 which determines the position of the vehicle on the map according to the positional coordinate produced from the map matching unit 43 and the positional coordinate produced from the satellite navigation system 45, and a path searching unit 48 for searching the route from the current position of the vehicle determined by the position determining unit 46 to a target position defined by a destination input unit 47. The position of the vehicle may also be determined from a beacon B.

The route searched by the path searching unit 48 consists of a number of points. The location of the vehicle t seconds later from the current time point can be predicted by supplying the route information and the current position information to a position predicting unit 49, and integrating the traveling speed Vs of the vehicle. The tangential direction of each point on the predicted path of travel of the vehicle is predicted by the target direction determining unit 4. How far ahead of the vehicle the point, at which the tangential direction should be predicted, should be placed may be selected according to the traveling speed of the vehicle and the computing capability of the control system.

If it is assumed that the direction of the tangential line of the point of the path which the vehicle reaches in t seconds is $\alpha_t$, and the predicted direction of the vehicle t seconds later from the current position is $\beta_t$, then, the directional deviation at that time point will be $ert=\alpha_t-\beta_t$. Thus, the vehicle can follow the path if the electric motor 6 produces steering torque so as to minimize the directional deviation ert. Therefore, by conducting a feedback control on the drive torque of the electric motor 6 so as to minimize the deviation between the target direction $\alpha_t$ and the actual direction $\beta_t$ of the vehicle, it is possible to prevent the vehicle from deviating from the intended path of travel even when the vehicle operator inadvertently fails to pay enough attention or even dozes off.

Figure 4:
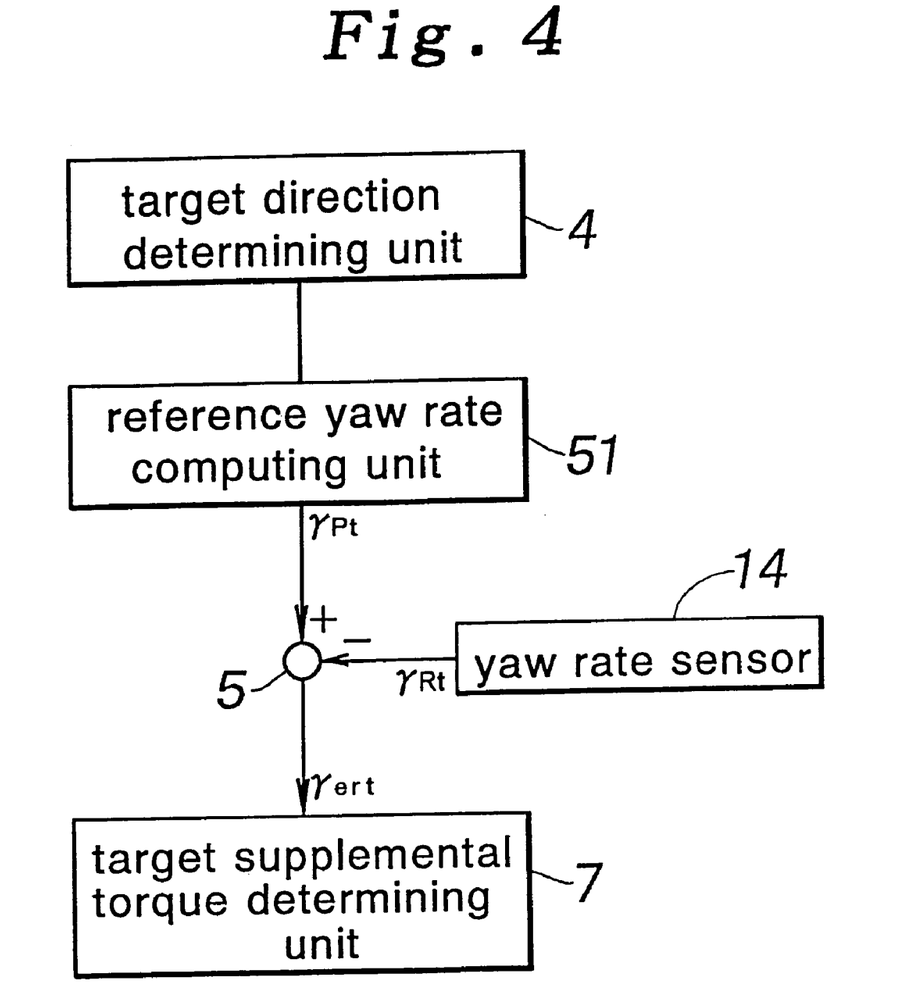
FIG. 4 is a block diagram of an alternate embodiment of the present invention.

The torque control of the electric motor 6 can be conducted differently from that described above which relies on the minimization of the directional deviation ert. For instance, instead of finding the directional deviation ert, it is also possible to obtain a deviation $\gamma_{ert}$ of an actual yaw rate $\gamma_{Rt}$ obtained from the yaw rate sensor 14 from a predicted value $\gamma_{Pt}$ of a yaw rate which is predicted to occur in time t according to the shape of the road ahead of the vehicle by using a reference yaw rate computing unit 51, as illustrated in FIG. 4. The torque of the electric motor 6 is feedback controlled so as to minimize this yaw rate deviation $\gamma_{ert}$.

Figure 5:
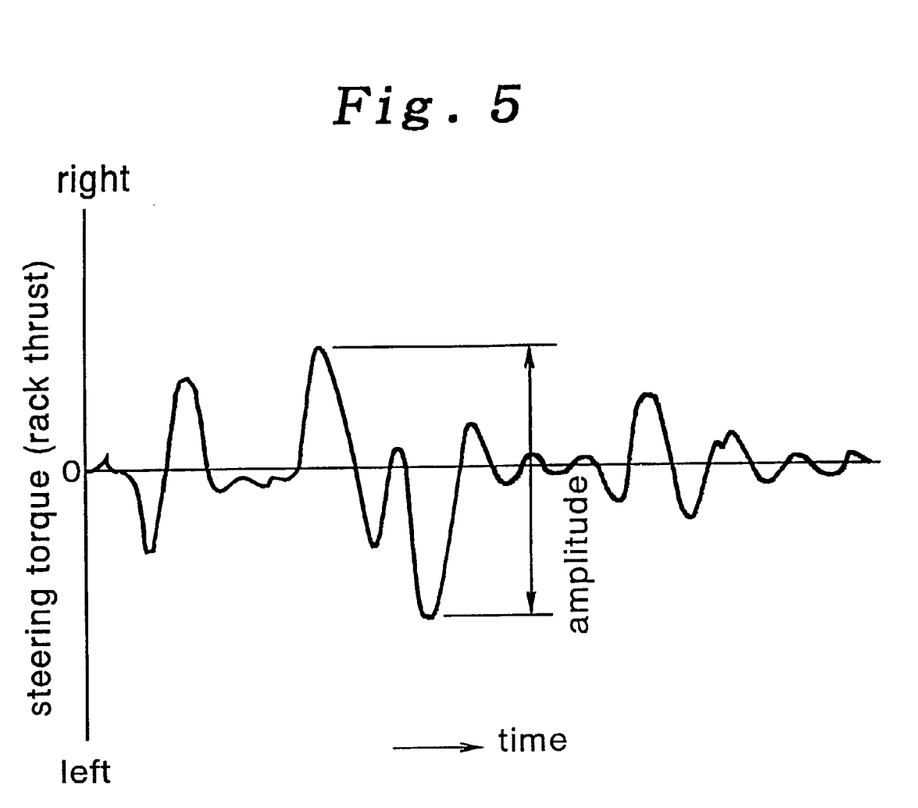
FIG. 5 is a wave diagram showing the principle of analyzing the steering torque to evaluate the alertness of the vehicle operator.

The structure of the above mentioned alertness determining unit 9 is now described in the following. It is known that a vehicle operator tends to repeat a corrective steering action when he feels drowsy and loses a sufficient alertness. When he temporarily dozes off, the vehicle deviates from the proper path of travel. But, he immediately wakes up, and makes a corrective steering action. In a not fully awake state, the vehicle operator tends to repeat this process. The end result is a repeated steering action which is not required under the given road condition. When this condition arises, the accumulated value of steering torque (or rack thrust) increases from a normal level as shown in FIG. 5. Therefore, it gives a measure of the alertness of the vehicle operator.

Figure 6:
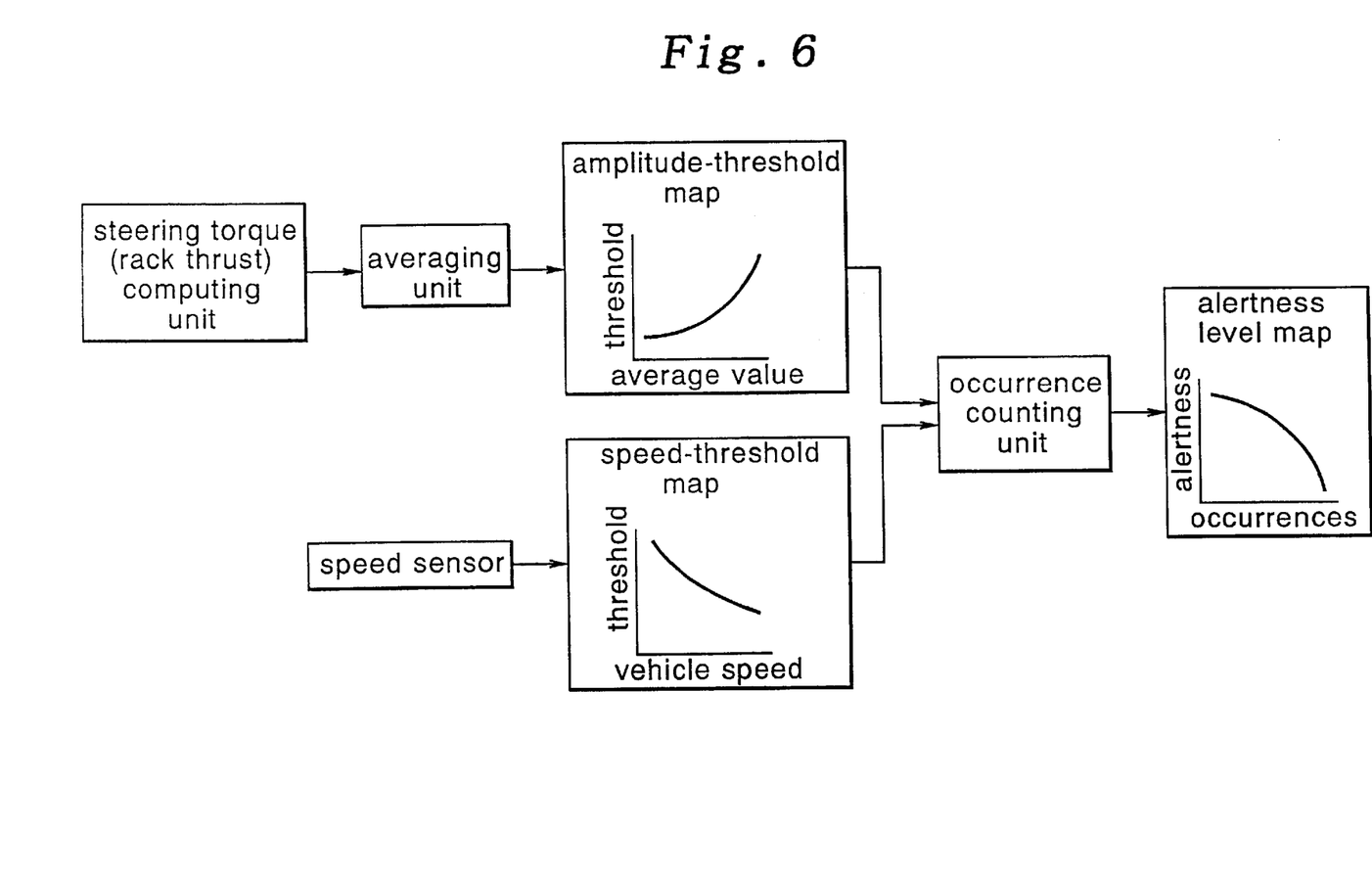
FIG. 6 is a block diagram of the system for determining the alertness of the vehicle operator from the steering torque and the vehicle speed.

For instance, the number of occurrences of a steering torque which is in a prescribed frequency range and which exceeds a certain threshold value is counted, and the alertness of the vehicle operator is evaluated by looking up in an alertness determining table using the number of occurrences as an index. The distinction between a normal corrective steering action and an abnormal steering action due to the lack of alertness of the vehicle operator can be made by referring to tables using the magnitude of the steering torque and the vehicle speed as the indices, respectively (FIG. 6).

Figure 7:
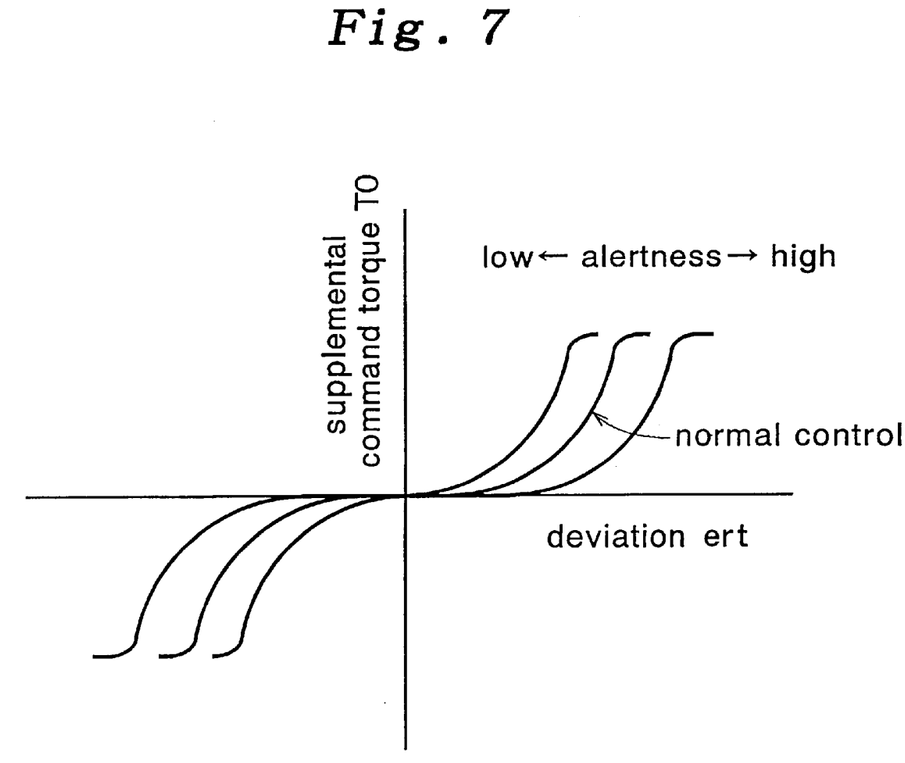
FIG. 7 is a graph showing the change in the supplemental steering torque in relation with the directional deviation of the vehicle in dependence on the alertness of the vehicle operator.

An alertness coefficient $K_1$ can be thus defined as a value which progressively increases as the alertness of the vehicle operator drops. The alertness coefficient $K_1$ is multiplied with the target supplemental torque at the target supplemental torque determining unit 7 so that the gain of the system for determining the target supplemental torque for a given directional deviation is increased with the drop in the alertness of the vehicle operator. It means that the tendency of the system to maintain the intended path of travel increases and, in other words, the degree of steering automatization increases as the alertness of the vehicle operator drops. Conversely, when the alertness of the vehicle operator is high, the gain of the system for determining the target supplemental torque for a given directional deviation is reduced so that the steering control system less interferes with the intentional steering effort of the vehicle operator (FIG. 7). The supplemental torque command value $T_0$ can be given by the following equation:

$$T_0 = f_1(K_1, ert, Vs)$$

Figure 8:
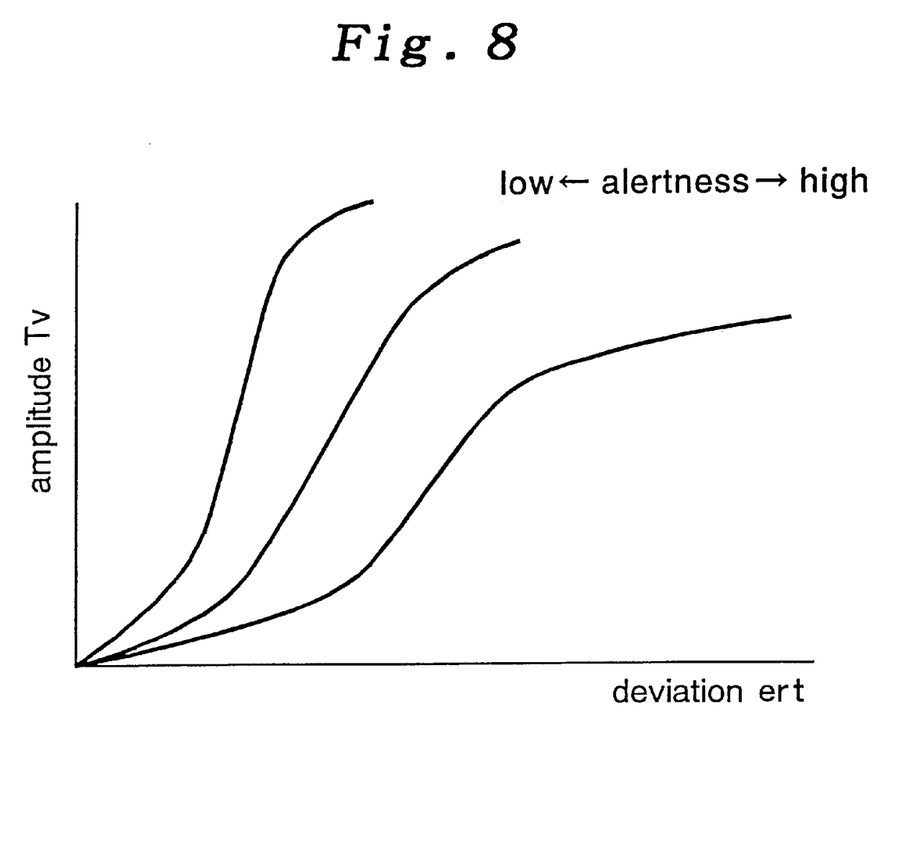
FIG. 8 is a graph for showing the change in the vibratory torque which is applied to the steering wheel for warning purposes in dependence on both the directional deviation and the alertness of the vehicle operator.

It is possible to apply an oscillating torque to the steering wheel to awaken the vehicle operator when the alertness of the vehicle operator drops below a certain threshold level. In this case, the amplitude Tv of the oscillating torque may be given as a function of the deviation ert, the alertness coefficient $K_1$, and the vehicle speed Vs, or $$Tv = f_2(K1, ert, Vs)$$

An example of this relationship is given in FIG. 8.

Figure 9:
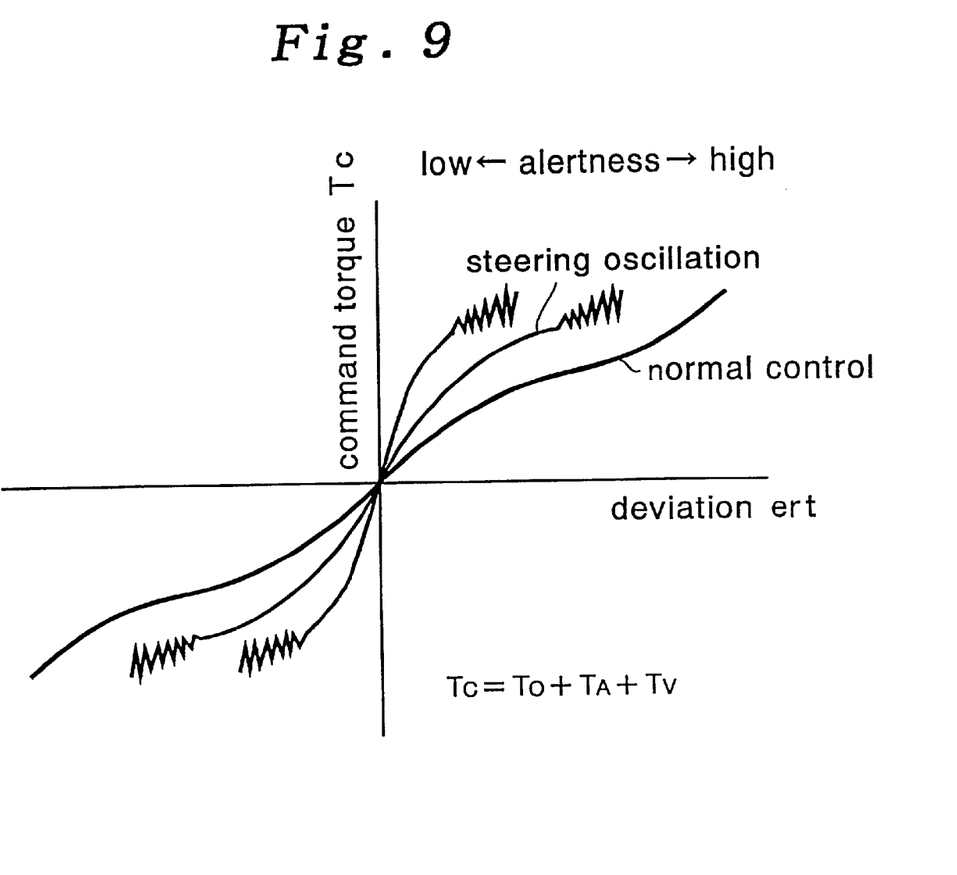
FIG. 9 is a graph showing the overall torque which the steering actuator applies to the steering system.

The command torque value Tc which is to be given to the electric motor 6 can be thus given as a total sum of the supplemental torque $T_0$, the assist torque $T_A$, and the oscillating torque Tv as shown in FIG. 9.

The abrupt steering actions associated with the drop in the alertness of the vehicle operator occurs without regard to the condition of the road. It is expected that when the alertness of the vehicle operator is low, the actual yaw rate significantly deviates from the predicted yaw rate which is predicted from the condition or the shape of the road. Therefore, it is also possible to determine the alertness of the vehicle operator from the degree of the deviation of the actual yaw rate from the predicted yaw rate. If desired, the accuracy of the determination of the alertness of the vehicle operator may be further improved by combining the two methods which rely on the changes in the steering torque (or the rack thrust) and the changes in the yaw rate, respectively.

According to the present invention, the alertness of the vehicle operator is determined from an operating condition of the vehicle such as the steering torque, the rack thrust, and/or the yaw rate, and the determined level of alertness of the vehicle operator is advantageously reflected in the control property of the steering control system. In other words, the level of automatization of the steering control system is appropriately changed depending on the level of alertness of the vehicle operator.

Although the present invention has been described in terms of preferred embodiments thereof, it is obvious to a person skilled in the art that various alterations and modifications are possible without departing from the scope of the present invention which is set forth in the appended claims.

What we claim is:

1. A vehicle steering control system, comprising:

manual steering input means for manually actuating a steering system of a vehicle;

an actuator for providing a supplemental steering torque to said steering system;

actual direction detecting means for detecting an actual traveling direction of said vehicle;

target direction determining means for defining a target traveling direction of said vehicle;

deviation computing means for determining a deviation of said actual traveling direction from said target traveling direction;

control means for controlling said actuator so as to reduce said deviation determined by said deviation computing means; and alertness determining means for determining an alertness of an operator of said vehicle from an operating condition of said vehicle;

said control means increasing a command torque for said actuator for a given value of said deviation with a decline in the alertness of said vehicle operator.

2. A vehicle steering control system according to claim 1, wherein:

said actual direction detecting means comprises a geomagnetic sensor; and said target direction determining means comprises a map information unit, a map matching unit, a global positioning system, and a position determining unit which can determine a shape of a road ahead of said vehicle.

3. A vehicle steering control system according to claim 1, wherein said control means comprises a feedback controller which commands a supplemental command torque to said actuator so as to minimize said deviation determined by said deviation computing means.

4. A vehicle steering control system according to claim 3, wherein a control gain of said feedback controller is increased in proportion to a decline in said alertness of said vehicle operator.

5. A vehicle steering control system according to claim 1, wherein said alertness determining means comprises means for collecting data on manual steering torque applied to said manual steering input means.

6. A vehicle steering control system according to claim 5, wherein said data on said manual steering torque comprises means for detecting each occurrence of a manual steering torque exceeding a threshold level, and means for counting said occurrences of a manual steering torque exceeding said threshold level.

7. A vehicle steering control system according to claim 1, wherein:

said target direction determining means comprises a map information unit, a map matching unit, a global positioning system, and a position determining unit which can determine a shape of a road ahead of said vehicle; and said alertness determining means comprises means for detecting an actual yaw rate of said vehicle, means for predicting a reference yaw rate which is predicted from said shape of a road ahead of said vehicle determined by said global positioning system, and means for collecting data on a deviation of said actual yaw rate from said reference yaw rate.

8. A vehicle steering control system, comprising:

manual steering input means for manually actuating a steering system of a vehicle;

an actuator for providing a supplemental steering torque to said steering system;

navigational guide means for predicting a traveling path of said vehicle;

actual yaw detecting means for detecting an actual yaw rate of said vehicle;

target yaw determining means for determining a target yaw rate of said vehicle according to said traveling path predicted by said navigational guide means;

deviation computing means for determining a deviation of said actual yaw rate from said target yaw rate;

control means for controlling said actuator so as to reduce said deviation determined by said deviation computing means; and alertness determining means for determining an alertness of an operator of said vehicle from an operating condition of said vehicle;

said control means increasing a command torque for said actuator for a given value of said deviation with a decline in the alertness of said vehicle operator.

* * * * *